(12) United States Patent
Gold et al.

(10) Patent No.: US 8,438,969 B2
(45) Date of Patent: May 14, 2013

(54) APPARATUS AND METHOD FOR DISSOLVING GASES IN A BEVERAGE

(75) Inventors: Eric A. Gold, Frisco, TX (US); Brian Lottig, McKinney, TX (US); Timothy J. Gross, Frisco, TX (US); Herbert Daniel Couture, III, Acworth, GA (US); Lawrence Michael Lucas, Acworth, GA (US)

(73) Assignee: Dr Pepper/Seven Up, Inc., Plano, TX (US)

( * ) Notice: Subject to any disclaimer, the term of this patent is extended or adjusted under 35 U.S.C. 154(b) by 498 days.

(21) Appl. No.: 12/774,992

(22) Filed: May 6, 2010

(65) Prior Publication Data

US 2011/0274806 A1  Nov. 10, 2011

(51) Int. Cl.
*B01F 3/04* (2006.01)
*A23L 2/00* (2006.01)

(52) U.S. Cl.
USPC ............. 99/323.1; 99/323.2; 261/43; 261/53; 261/102; 261/105; 261/DIG. 7; 426/477

(58) Field of Classification Search .................. 99/323.2, 99/323.1; 261/43, 53, 28, 59, 102, 105, 122.1, 261/133, DIG. 7; 366/107, 101, 102; 222/4, 222/132, 135, 145.6, 399; 426/477
See application file for complete search history.

(56) References Cited

U.S. PATENT DOCUMENTS

| | | | |
|---|---|---|---|
| 4,517,135 A * | 5/1985 | Szerenyi et al. | 261/104 |
| 4,874,116 A | 10/1989 | Fallon et al. | |
| 4,911,212 A * | 3/1990 | Burton | 141/369 |
| 4,928,850 A | 5/1990 | Fallon et al. | |
| 5,062,548 A * | 11/1991 | Hedderick et al. | 222/190 |
| 5,552,171 A | 9/1996 | Gibney et al. | |
| 5,565,149 A * | 10/1996 | Page et al. | 261/140.1 |
| 5,806,550 A * | 9/1998 | Frank | 137/7 |
| 7,114,707 B2 | 10/2006 | Rona et al. | |
| 7,569,027 B2 | 8/2009 | Uesugi et al. | |
| 7,717,294 B2 * | 5/2010 | Bodemann | 222/53 |
| 2011/0180148 A1 * | 7/2011 | Xia et al. | 137/1 |

* cited by examiner

*Primary Examiner* — Reginald L Alexander
(74) *Attorney, Agent, or Firm* — Cox Smith Matthews Incorporated

(57) ABSTRACT

Disclosed is an apparatus for dissolving gases in a beverage, the apparatus including a product conduit that is fluidly communicable with a product supply and a product dispenser, a gas conduit configured to transport gas from a gas supply to the product conduit, the gas conduit including at least one flow control mechanism; and at least one additional gas conduit configured to transport an additional gas from at least one additional gas supply to the product conduit, the gas conduit including an additional flow control mechanism.

18 Claims, 2 Drawing Sheets

APPARATUS AND METHOD FOR DISSOLVING GASES IN A BEVERAGE

TECHNICAL FIELD

Figure 1:
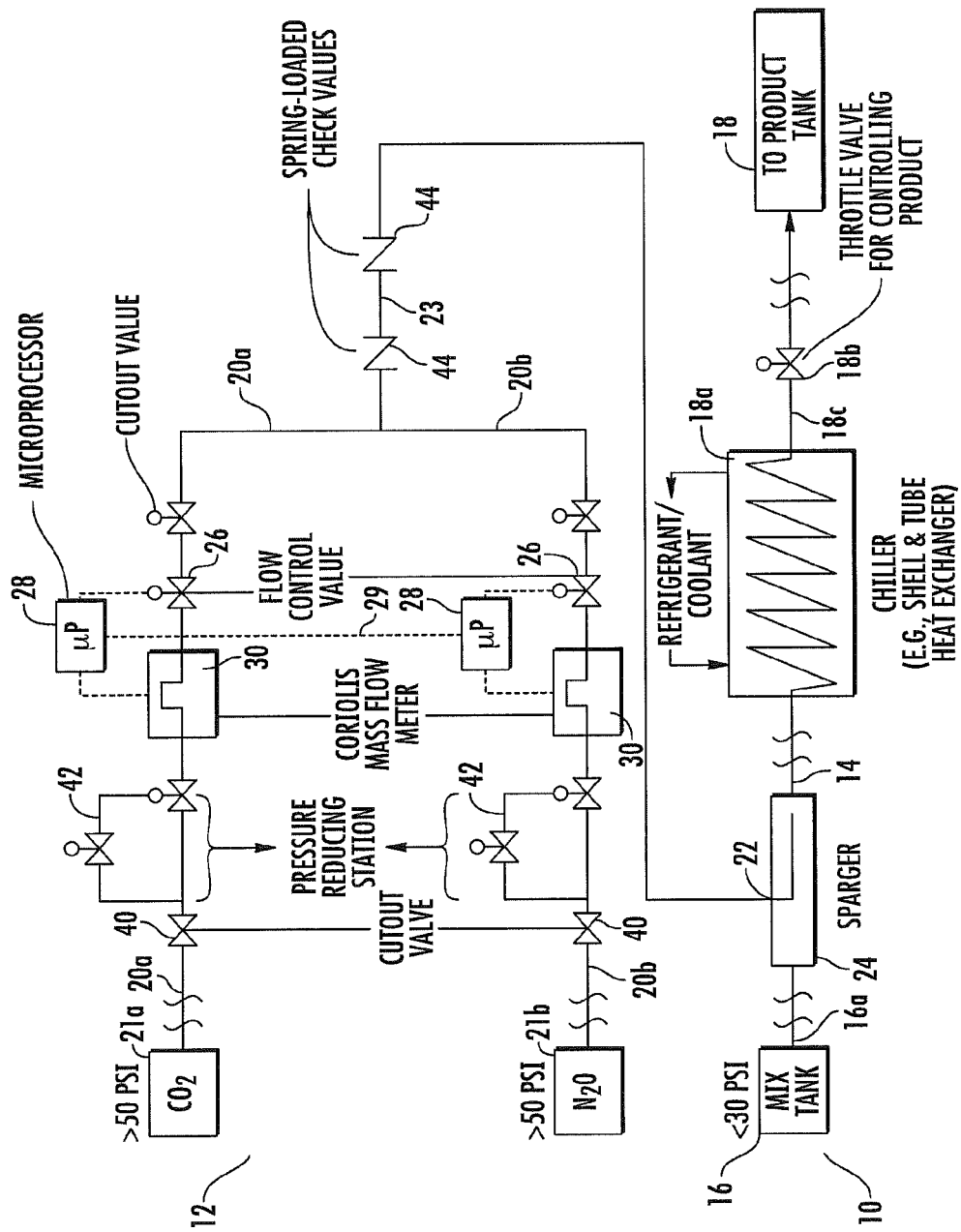

This disclosure relates generally to an apparatus and method for dissolving gases in a beverage, and more particularly to an apparatus and method for dissolving two or more gases in a beverage.

BACKGROUND

Many beverages require certain levels of gases to be dissolved in at least one constituent liquids prior to dispense in order to achieve the desired taste and or presentation effects in the final beverage. Examples of such beverages include carbonated juices, sodas, and the like.

In certain applications, it is desirable to dissolve two or more gases (such as carbon dioxide and nitrous oxide) into these beverages. In the current state of the art, this dissolving is facilitated by blending the two or more gases at a system position located upstream of control valves and coriolis flow meters designed to accurately dissolve the gases into a beverage. However, under such a system, it can be difficult to accurately control the desirable concentrations or ratios of the individual gases that are to be dissolved into the beverage. This is because movement of gases with different diffusion rates into the beverage can be difficult to control using control valves and mass flow meters located only at positions downstream of gas blending. Such a difficulty can of course result in inaccurate gas ratios within the beverage. In addition, it can be difficult to independently regulate the pressure and volume of each gas entering the beverage after the gases are blended. As such difficulties can effect amounts of the gases dissolved into the beverage, this can also result in inaccurate gas ratios within the beverage. These difficulties can cause further issues in employing various modern smart technologies that allow gas injections to be automatically adjusted according to individually desirable ratios.

Accordingly, an apparatus capable of more accurately controlling entry of different gases into a beverage at individually appropriate ratios would be desirable.

SUMMARY

Disclosed is an apparatus for dissolving gases in a beverage, the apparatus including a product conduit that is fluidly communicable with a product supply and a product dispenser, a gas conduit configured to transport gas from a gas supply to the product conduit, the gas conduit including at least one flow control mechanism; and at least one additional gas conduit configured to transport an additional gas from at least one additional gas supply to the product conduit, the gas conduit including an additional flow control mechanism.

Also disclosed is a method for dissolving gases in a beverage, the method including creating a product flow from a product supply to a product dispenser via a product conduit, regulating flow of a gas into the product conduit via a control mechanism associated with a gas conduit configured to transport the gas to the product conduit, regulating flow of an additional gas into the product conduit via an additional control mechanism associated with an additional gas conduit configured to transport the additional gas to the product conduit.

Additionally disclosed is a system for dissolving gases in a beverage, the system including a product supply tank, a product dispenser, a product conduit that fluidly communicates the product supply tank with the product dispenser, a gas conduit configured to transport gas from a gas supply to the product conduit, the gas conduit including at least one control mechanism, and at least one additional gas conduit configured to transport an additional gas from at least one additional gas supply to the product conduit, the gas conduit including an additional control mechanism.

Further disclosed is an apparatus for dissolving gases in a beverage, the apparatus including a beverage conduit that is fluidly communicable with a beverage supply and a beverage dispenser, a first gas conduit configured to transport a first gas from a first gas supply to the beverage conduit, said first gas conduit including a first flow control mechanism, and a second gas conduit configured to transport a second gas from a second gas supply to the beverage conduit, the second gas conduit including a second flow control mechanism, wherein the beverage dispenser dispenses a liquid beverage for human consumption containing the first and second gasses, and wherein the apparatus comprises only two gas conduits.

DRAWINGS

Figure 2:
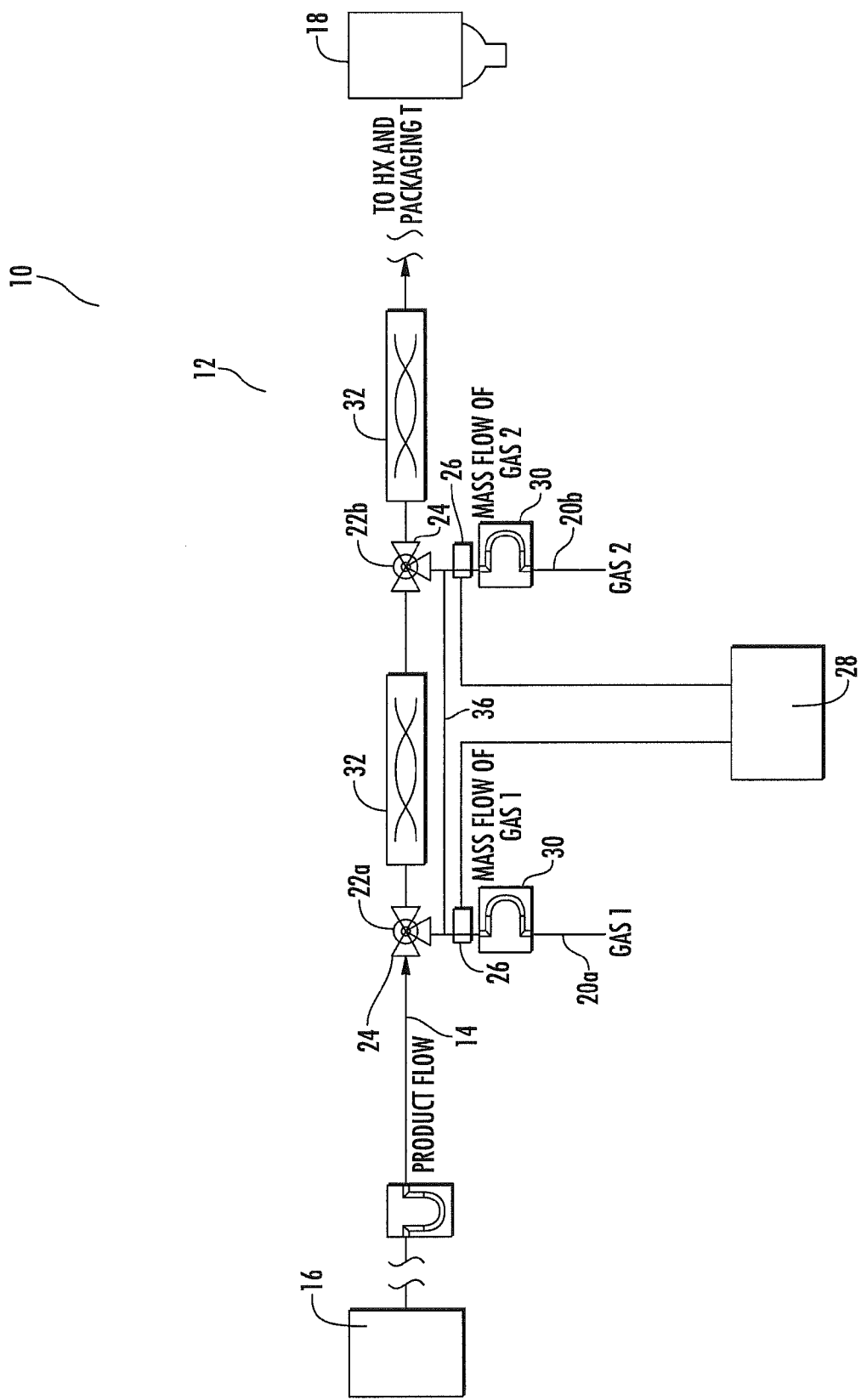

Referring now to the Figures, exemplary embodiments are illustrated, wherein the elements are numbered alike:

FIG. 1 is a schematic representation of a system for dissolving gas into a beverage in accordance with a first exemplary embodiment; and FIG. 2 is a schematic representation of the system for dissolving gas into a beverage in accordance with a second exemplary embodiment;

DETAILED DESCRIPTION

Referring to FIG. 1, a system 10 for dissolving gases into a beverage is illustrated in accordance with an exemplary embodiment. In this embodiment, the product receiving the gases is a liquid, such as a liquid beverage. The system includes an apparatus 12 (shown within the border labeled 12), which itself includes a product conduit 14 that fluidly communicates product supply elements (generally labeled 16) with product filler or dispenser elements (generally labeled 18). Product within the various product supply conduits and tanks 16 will be referred to herein as raw product in the sense that it is not inclusive of gases that will eventually be dissolved therein. Such gases are dissolved into the product during a flow thereof from the supply 16 to the dispenser 18 via the conduit 14. The various apparatus elements employed to transport and dissolve the gases into the product will be discussed hereinbelow.

Referring to FIG. 1, the supply elements 16 are schematically illustrated. The supply elements 16 may include a syrup supply and water supply, as well as a water tank, syrup tank, and mix tank. These supplies, tanks, various conduits that connect them, and various pumps and valves disposed therewith, are configured to mix the water and syrup, and transport it as raw product to the product conduit 14. In the exemplary embodiment of FIG. 1, this raw product is transported to the product conduit 14 via connecting conduit 16a.

As shown in FIG. 1, the product conduit 14 is the system conduit into which the raw product, and the gases to be diffused therein, flows. Gas enters the product conduit 14 via gas inlet 22, which creates a fluidly communicable point of entry between the product conduit 14 and gas conduit(s) of the system 10. In the exemplary embodiment of FIG. 1, gases are transported to this inlet 22 as described below.

The system 10 includes a first gas (carbon dioxide in this embodiment) and a second gas (nitrous oxide in this embodiment), though any number of additional of gases of any desirable kind may be transported within the system 10 and apparatus 12. For convenience and ease of understanding, these different gases will simply be referred to as the first gas and the second gas. The first gas flows from an appropriate gas supply 21a (carbon dioxide in this exemplarity embodiment) to a blend conduit 23 via a first gas conduit 20a. Similarly, the second gas flows from an appropriate gas supply 21b (nitrous oxide in this exemplarity embodiment) to the blend conduit 23 via a second gas conduit 20b. It should be noted that pressure in the gas conduits 20a and 20b immediately downstream from the gas supplies 21a and 21b is approximately 200 psi. This pressure is reduced at the pressure reducing stations to about 95-115 psi, and remains as such at least until entering the blend conduit 23.

As is shown in FIG. 1, the first and second gas conduits 20a also include a gas proportional flow control valves 26. These valves 26, which may be any type controllable valve, such as a pneumatic or mechanical driven valve or pump, which can adjust the flow upon receipt of a control signal. An example of such a valve is manufactured by Cherry-Burrell Company of Delavan, Wis. As shown in FIG. 1, these valves 26 are located upstream of the blend conduit 23, and may be linked to and controlled by controller/control system 28, such as microprocessors (linked to each other via connection 29 in FIG. 1) or other computing resource(s). This control allows individual, manual or automatic (i.e. software inspired) control of gas volume to be injected into the blend conduit 23 from each gas conduit 20a and 20b. This control system 28 accordingly allows for injection of the first and second gases into the blend conduit 23 at any individually desirable volumes that may be calculated.

It should be appreciated that the control system 28 may operate under various methods (or combinations thereof) for adjusting blending of a beverage and gas flow therein. Such methods, and the calculations/equations used in these methods, are discussed in Gibney, et al. U.S. Pat. No. 5,552,171. This Gibney, et al. patent is herein incorporated by reference. The adaptation of the present invention to operate along with Gibney type methods and teachings is contemplated to be within the skill of the art.

It should also be noted that each gas conduit 20a and 20b is shown to be equipped with a mass flow meter 30. These flow meters 30 are structured in accordance with any mass flow meters known in the art, such as but not limited to the Coriolis mass flow meters 30 shown in FIG. 1. Coriolis-type mass flow meters are contemplated because of their high accuracy in determining the mass flow rate and total mass flow of a fluid without reference to the temperature or viscosity of the fluid. The size and operational capabilities of meters 30 will depend upon various factors such as flow rate.

As is also shown in FIG. 1, these flow meters 30 are disposed on each conduit 20a and 20b in a position upstream of the blend conduit 23. Such individual regulation is beneficial in that it allows separate control of first and second gas amounts that will ultimately travel into the blend conduit 23 and product conduit 14 to be dissolved into the product at desirable proportions. The mass flow meters 30 may also be linked to the control system 28 in order to control the maintenance and regulation discussed above.

After entering the blend conduit 23, the now blended first and second gases are transported to the product conduit 14. The gases enter the product conduit 14 and at least begin the process of diffusion into the product running therethrough via inlet 22. It should be appreciated that these inlets may be structured to inject gas into a product containing conduit (such as conduit 14) in accordance with any inlet mechanism or diffuser known in the art. In an exemplary embodiment, a porous metal 24 (such as a steel sintered sparger with microscopic openings) that acts to facilitate diffusion may be disposed proximate the inlet 22. This metal 24 may be disposed within the blend conduit 23 (just outside the inlets) or within the inlet 22 itself.

The blended gas passes into the product conduit 14 (through the inlet 22) and at least begins to diffuse into the raw product flowing therethrough due to maintenance of the gas pressure above a saturation pressure of the raw product. By maintaining, the gas at this higher pressure, the blended gas can be completely diffused into the product. In an exemplary embodiment, the gas pressures in the blend conduit 23 and gas conduits 20a and 20b are maintained above 90 psi, while the pressure in the product conduit 14 is below 80 psi.

The product conduit 14 may further be equipped with at least one static mixer. Static mixers are structured in accordance with any gas diffusing mixers known in the art. Such mixers, if employed, may act to further facilitate diffusion of the first and second gas into the product flowing through the product conduit 14.

Product with the blended gas diffused therein is transported downstream from the product conduit to the dispenser elements 18 of the system 10. These elements 18 include a heat exchanger or chiller 18a, a throttle valve 18b (connected to the product conduit 14 via connecting conduit 18c), and container filling mechanisms (not illustrated) associated with a product tank. Pressure in the product conduit is about 45 to 80 psi just upstream of the product tank.

It should be appreciated that an exemplary embodiment of the system 10 may also employ various other valve mechanisms disposed along the gas conduits 20a and 20b and blend conduit 23. These valves may include cutout valves 40, and spring loaded check valves 44, such as those shown in FIG. 1.

Referring now to FIG. 2, the system 10 for dissolving gases into a product is illustrated in accordance with another exemplary embodiment. As is shown in FIG. 2, the apparatus 12 again includes two gas conduits 20a and 20b. However, in this embodiment, the two gas conduits 20a and 20b are each disposed in separate fluid communication with the product conduit 14 via separate gas inlets 22a and 22b defined by the conduit 14. Each of these gas conduits 20a and 20b are connected to separate gas supplies (not shown in FIG. 2), which supply the gases to be transported to, and eventually dissolved into, the product flowing through the product conduit 14. Each connected gas supply contains a different gas. In an exemplary embodiment, these different gases are again carbon dioxide and nitrous oxide, which will again be hereafter referred to a first gas and a second gas. The first gas is supplied to the conduit 14 via gas conduit 20a, and the second gas is supplied to the conduit via gas conduit 20b. It should be noted that while two gas conduits 20a and 20b and two gases are shown and discussed in the Figures and description of this Application, this two gas two conduit configuration is merely exemplary. The apparatus 12 may of course be configured to include an essentially unlimited number of gas conduits (and gases transported therein) disposed to communicate with the product conduit 14.

Referring now to the inlets 22a and 22b mentioned briefly above, it should be appreciated that these inlets may be structured to inject gas into a product containing conduit (such as conduit 14) in accordance with any inlet mechanism known in the art. In an exemplary embodiment, a porous metal 24 (such as a steel sintered sparger with microscopic openings) that acts to facilitate diffusion may be disposed proximate the inlet 22. This metal 24 may be disposed within each of the gas conduits 20a and 20b (just outside the inlets) or within the inlet 22 itself.

The blended gas passes into the product conduit 14 (through the inlets 22a and 22b) and at least begins to diffuse into the raw product flowing therethrough due to maintenance of the gas pressure above a saturation pressure of the raw product. By maintaining, the gas at this higher pressure, the blended gas can be completely diffused into the product.

Similarly to that which is shown in FIG. 1 (and discussed in relation thereto), each gas conduit 20a and 20b includes gas proportion control valves 26. These control valves 26 may again be linked to a control system 28, such as a microprocessors (which may be linked) or other computing resource, that allows individual, manual or automatic (i.e. software inspired) control of gas volume to be injected into the product conduit 14 from each gas conduit 20a and 20b. This control system 28 accordingly allows for injection of the first and second gases into the product conduit 14 at individually desirable proportions.

Each gas conduit 20a and 20b is also equipped with mass flow meters 30, which are again similar to that which is shown in FIG. 1 (and discussed in relation thereto). These mass flow meters 30 individually measure gas flow rate flowing through each of the gas conduits 20a and 20b, which aids in regulating and maintaining gas pressure within these gas conduits 20a and 20b. Such individual regulation is beneficial in that it allows separate control of first and second gas amounts that will ultimately be dissolved into the product at desirable proportions.

As shown in FIG. 2, the product conduit 14 may further be equipped with at least one static mixer 32. FIG. 2 shows an exemplary position of the static mixers 32 relative to the gas conduits 20a and 20b, wherein a mixer 32 is disposed just downstream of each inlet 22a and 22b. It should be noted however that alternate positions for these mixers 32 (and absence of the mixers 32 all together) are contemplated in this system 10. These alternate positions include, but are not limited to, a single mixer 32 disposed downstream of both inlets 22a and 22b.

It should be appreciated that, in an exemplary embodiment, the first and second gases include a substantially similar solubility relative to the product flowing through the product conduit 14. Further, with reference to FIG. 2, it should be appreciated that gas conduits 20a and 20b may be optionally equipped with a blending conduit 36, which is configured to fluidly communicate gas conduit 20a with gas conduit 20b at a position disposed upstream of the inlets 22a and 22b, but downstream of the control valves 26 and mass flow meters 30.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An apparatus for dissolving gases in a beverage, the apparatus comprising:
a product conduit that is fluidly communicable with a product supply and a product dispenser;
a gas conduit configured to transport gas from a gas supply to said product conduit, said gas conduit including at least one flow control mechanism; and
at least one additional gas conduit configured to transport an additional gas from at least one additional gas supply to said product conduit, said gas conduit including an additional flow control mechanism;
wherein said flow control mechanism and said additional flow control mechanism include a gas proportion control valve and an additional control valve, said gas proportion control valve and said additional control valve being in communication with a control system;
wherein each of said gas proportion control valve and said additional control valve is configured for individual adjustment upon receipt of a signal from said control system.

2. The apparatus of claim 1, wherein said gas conduit and said at least one additional gas conduit fluidly communicate with said product conduit via at least one inlet defined by said product conduit.

3. The apparatus of claim 1, further comprising:
at least one gas inlet; and
a porous metal sintered sparger disposed proximate said at least one gas inlet;
wherein said gas conduit and said at least one additional gas conduit fluidly communicate such that a volume of said gas and a volume of said additional gas are blendable in a blend conduit disposed upstream of said gas inlet, said flow control mechanism and said additional flow control mechanism being disposed upstream of said blend conduit.

4. The apparatus of claim 1, wherein said gas conduit is in fluid communication with said product conduit via an inlet defined by said product conduit and wherein said at least one additional gas conduit is in fluid communication with said product conduit via at least one additional inlet defined by said product conduit.

5. The apparatus of claim 2, wherein said product conduit is disposed with at least one static mixer, said static mixer being disposed downstream of said at least one inlet.

6. The apparatus of claim 2, wherein a porous metal is disposed proximate said at least one inlet.

7. The apparatus of claim 6, wherein said porous metal is a sintered sparger.

8. The apparatus of claim 1, wherein said flow control mechanism and said additional flow control mechanism include a mass flow meter and additional mass flow meter, said mass flow meter and said additional mass flow meter being linked with said control system;
wherein said gas proportional control valve and said additional control valve are pneumatically or mechanically adjustable upon receipt of a control signal from said control system.

9. The apparatus of claim 8, wherein said control system is a computing resource.

10. The apparatus of claim 1, wherein said flow control mechanism and said additional flow control mechanism include a mass flow meter and additional mass flow meter, said mass flow meter and said additional mass flow meter being configured for at least one of regulation and maintenance of gas pressure within said gas conduit and said at least one additional gas conduit.

11. The apparatus of claim 1, wherein said gas supply and additional gas supply contain different gases.

12. A system for dissolving gases in a beverage, the system comprising:
a product supply tank;

a product dispenser;

a product conduit that fluidly communicates said product supply tank with said product dispenser, said product conduit being equipped with at least one static mixer;

a gas conduit configured to transport gas from a gas supply to said product conduit via a first inlet, said gas conduit including a first control mechanism positioned upstream of said first inlet;

wherein said first control mechanism comprises a first mass flow meter and a first gas proportion control valve;

at least one additional gas conduit configured to transport an additional gas from at least one additional gas supply to said product conduit via a second inlet, said additional gas conduit including a second control mechanism positioned upstream of said second inlet;

wherein said second control mechanism comprises a second mass flow meter and a second gas proportion control valve; and a control system configured to regulate a ratio of said gas to said additional gas transported to said product conduit;

wherein said at least one static mixer is positioned downstream of said first inlet and said second inlet.

13. An apparatus for dissolving gases in a beverage, the apparatus comprising:

a beverage conduit that is fluidly communicable with a beverage supply and a beverage dispenser;

a first gas conduit configured to transport a first gas from a first gas supply to said beverage conduit via a first inlet, said first gas conduit including a first flow control mechanism;

a second gas conduit configured to transport a second gas from a second gas supply to said beverage conduit via a second inlet, said second gas conduit including a second flow control mechanism; and a static mixer disposed downstream of said first inlet and said second inlet;

wherein the beverage dispenser dispenses a liquid beverage for human consumption containing the first and second gasses;

wherein the apparatus comprises only two gas conduits.

14. The apparatus of claim 13, wherein the first gas and the second gas are the same gas.

15. The apparatus of claim 13, wherein the first gas and the second gas are different gases.

16. A system for dissolving gases in a beverage, the system comprising:

a product conduit that is fluidly communicable with a product supply and a product dispenser;

a first gas conduit configured to transport a first gas from a first gas supply tank to a blend conduit, said first gas conduit including a first mass flow meter and a first gas proportional flow control valve;

a second gas conduit configured to transport a second gas from a second gas supply tank to said blend conduit, said second gas conduit including a second mass flow meter and a second gas proportional flow control valve;

a control system comprising a computing resource and configured to provide a control signal to each of said first gas proportional flow control valve and said second gas proportional flow control valve, said control signal configured to separately adjust a volume of said first gas injectable into said blend conduit and a volume of said second gas injectable into said blend conduit;

wherein the control system is further linked to each of said first mass flow meter and said second mass flow meter to regulate and maintain a gas pressure in each of said first gas conduit and said second gas conduit;

wherein said blend conduit fluidly communicates with said product conduit via at least one inlet defined by said product conduit; and a porous metal sparger disposed proximate said inlet;

wherein the product conduit is equipped with at least one static mixer downstream of said inlet, said at least one static mixer being configured to facilitate diffusion of said first gas and said second gas into said beverage.

17. A method for dissolving gases in a beverage, the method comprising:

creating a product flow from a product supply to a product dispenser via a product conduit;

regulating flow of a gas into a blending conduit via a control mechanism associated with a gas conduit configured to transport said gas to said blending conduit;

regulating flow of an additional gas into said blending conduit via an additional control mechanism associated with an additional gas conduit configured to transport said additional gas to said blending conduit;

wherein said regulating of said gas flow and said additional gas flow includes regulating a ratio of said gas to said additional gas flowing into said blending conduit via a gas proportion control valve and an additional control valve, said gas proportion control valve and said additional control valve being in communication with a control system;

wherein said regulating of said gas flow and said additional gas flow includes maintaining a pressure within said gas conduit and said additional gas conduit via a mass flow meter and an additional mass flow meter;

blending said gas and said additional gas at a blending point of said blending conduit to form a blended gas mixture, said blending point being upstream of said product conduit;

injecting the blended gas mixture into said product conduit via at least one inlet defined by said product conduit, said product conduit being equipped with at least one static mixer; and mixing the product and the blended gas mixture within said at least one static mixer.

18. The method of claim 17, wherein said gas proportion control valve and said additional control valve are pneumatically or mechanically adjusted by said control system;

wherein said control system is further linked to said mass flow meter and said additional mass flow meter.

* * * * *